United States Patent [19]
Klautschek et al.

[11] 3,919,609
[45] Nov. 11, 1975

[54] METHOD AND CIRCUIT FOR REDUCING THE TORQUE RIPPLE OF A ROTATING-FIELD MACHINE

[75] Inventors: Herwig Klautschek, Furth; Dieter Köllensperger, Erlangen, both of Germany

[73] Assignee: Siemens Aktiengesellschaft, Munich, Germany

[22] Filed: June 27, 1973

[21] Appl. No.: 374,002

[30] Foreign Application Priority Data
July 14, 1972 Germany................ 2234681

[52] U.S. Cl. ............... 318/227; 321/9; 321/10
[51] Int. Cl. ............................. H02d 5/40
[58] Field of Search ............ 318/227; 321/5, 9, 10

[56] References Cited
UNITED STATES PATENTS

| | | | |
|---|---|---|---|
| 3,458,797 | 7/1969 | Larsen | 321/9 |
| 3,486,104 | 12/1969 | Epstein | 321/10 |
| 3,546,551 | 12/1970 | Risberg et al. | 318/227 |
| 3,577,052 | 5/1971 | Bauer | 318/227 X |
| 3,577,059 | 5/1971 | Kelly, Jr. | 321/10 |
| 3,584,279 | 6/1971 | Krauthamer | 318/227 |
| 3,619,749 | 11/1971 | Schieman | 318/227 X |
| 3,748,556 | 7/1973 | Gillett | 318/227 |
| 3,775,652 | 11/1973 | Bowler | 318/227 |
| 3,800,199 | 3/1974 | Weigand | 318/227 |

*Primary Examiner*—Benjamin Dobeck
*Attorney, Agent, or Firm*—Kenyon & Kenyon Reilly Carr & Chapin

[57] ABSTRACT

A method and circuit for reducing torque ripple in rotating field machines in which the actual torque is sensed and the sensed value compared with a reference torque value and the difference used to correct the machine current so as to cancel the ripple.

9 Claims, 2 Drawing Figures

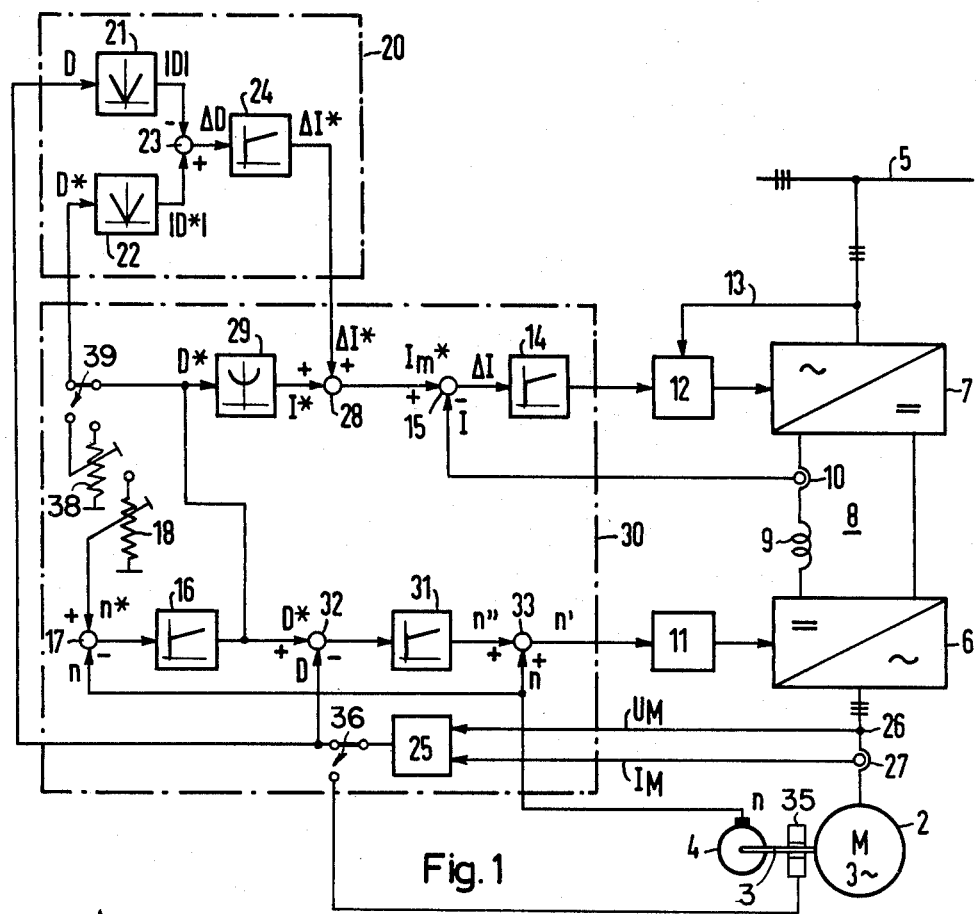
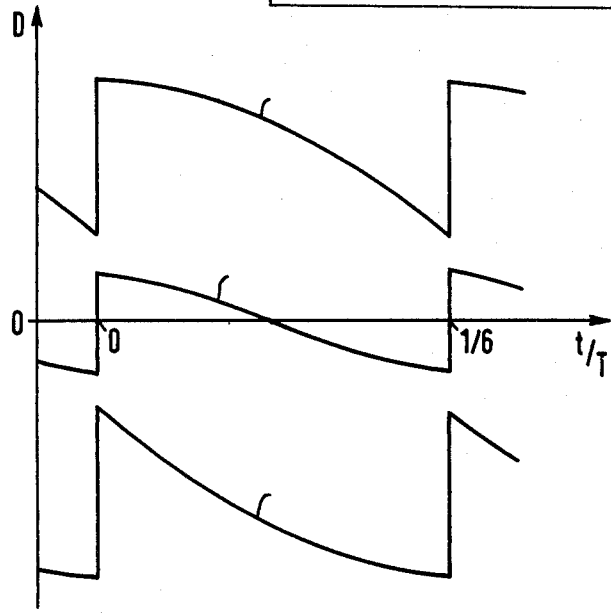
Fig. 1
Fig. 2

METHOD AND CIRCUIT FOR REDUCING THE TORQUE RIPPLE OF A ROTATING-FIELD MACHINE

BACKGROUND OF THE INVENTION

This invention relates to rotating field machines in general, and more particularly to a method and a circuit for reducing the torque ripple in such machines. One known manner of controlling rotating field machines is to rectify a three-phase AC voltage and couple the rectified output, which will be a DC link, to an inverter the frequency of which may be controlled. In addition, in such systems, means are provided to control the current flowing in the DC link to thereby provide control of the motor. Such a system is shown, for example, in German Offenlegungsschrift No. 1,513,518. In systems such as this, the rectifier is coupled to the three-phase line and is equipped with controlled rectifiers which may be tubes or semi-conductor devices which devices are controlled by control pulses from a control unit which is synchronized with the three-phase line voltage. The DC voltage and current is then supplied to an inverter which is similarly equipped with controlled devices, i.e., tubes or semi-conductor devices, to convert the DC voltage to a three-phase voltage of adjustable frequency for use in driving the rotating field machine. The inverter can be operated through its control unit using internal or external timing. In the DC link between the rectifier and the inverter a smoothing choke is installed which results in a decoupling effect, allowing the three-phase voltage at the rotating field machine to develop freely. That is, its wave shape will be nearly independent of the voltage wave shape in the intermediate link. The current in the DC link remains almost constant during the commutation and thereby only DC current, held constant by the smoothing choke, needs to be commutated. If the system is to be used for generator operation, where the energy flows in the reverse direction, the intermediate link voltage is reversed with the direction of the current remaining the same. This is possible because of the absence of free-running conversion devices and through the changing of the control angle of the converter on the machine side. Both the rectifier and the inverter can be termed generally as converters and thus when speaking of a converter, either is referred to.

In German Offenlegungsschrift No. 1,814,400 and in "Siemens Zeitschrift" Vol. 45, April 1971, No. 4, pages 195-197 [special reprint], a control circuit to keep the current in a DC link constant is shown. In the same issue of "Siemens Zeitschrift" at pages 177-182, the fact that harmonic torques of higher order are superposed on the mean torque of a synchronous machine supplied from such an intermediate link inverter in which two converters in a three-phase bridge circuit are used is disclosed. The order of these harmonic torques is given by an integral multiple of the number of pulses of the converter on the machine side. For example, with a six-pulse link converter, harmonics with 6, 12, 18, etc. times the machine frequency occur due to the rectangular non-sinusoidal currents which result from switching in the converter. The torque ripple caused thereby is undesirable and quite noticeable, particularly at very low machine frequencies, causing an uneven run and chattering. In the above-mentioned article in "Siemens Zeitschrift," one method of reducing torque ripple is disclosed. It is suggested there that rather than use six-pulse circuits, that twelve pulse circuits be used instead. Thereby the lowest harmonic will be of the 12th order. Although such a solution works reasonably well, it requires considerable expenditure for the control unit of the converters as well as of the converters themselves. For example, the number of controlled switching devices, i.e., tubes or semi-conductors, in the converter on the machine side must be doubled.

Thus, it can be seen that there is a need for reducing torque ripple found in such systems without materially adding to the expense of the system.

SUMMARY OF THE INVENTION

The present invention provides a method and a circuit for use in a system of the nature described above which will substantially reduce the torque ripple, particularly at low machine frequencies. The method and circuit are easy to implement and are applicable both for motor and generator operations, i.e., for both directions of energy flow. Although disclosed in connection with a three-phase synchronous machine, the method and circuit are also usable with any other type of rotating field machine, e.g., asynchronous three-phase machines.

To solve this problem, the actual value of the torque of the rotating field machine is compared with a predetermined reference value of torque and the difference or deviation between the two superimposed on the reference value used to control the current flowing in the intermediate DC link. To accomplish this, the actual torque value and reference torque value are fed to a comparator, or summing junction, the output of which is provided to a torque control, whose output in turn is added, in an adding stage, to the reference value for the current in the intermediate link. In theory, the invention is based on the fact that at low machine frequencies, i.e., where the period of the machine frequency is still long as compared to the regulating time of the current control and the current control circuit, it is possible to modulate the current in the link. At higher machine frequencies, during steady state operation, the control circuit will normally keep this current constant. However, by modulating the current at low frequencies, the torque of the rotating field machines assumes a uniform shape with respect to time.

It should be noted that the sign of the actual value of the torque will change when operation is changed from that of a motor to a generator. Therefore, in a further embodiment of the circuit, the torque value is first fed to an absolute value circuit, the output of which is connected to the one input of the comparator. Similarly, since with the reversal of torque direction the sign of the reference value is also generally changed, the reference torque value is similarly fed to another absolute value circuit whose output is connected to the other input of the comparator.

To determine the actual value of the torque, a torque transducer is attached to the rotor shaft of the three-phase machine. Alternatively, a torque computer may be used which computes from the actual value of machine voltage and machine current the torque. The reference value of torque may be set into the comparator or the absolute value circuit in any conventional fashion. For example, a potentiometer can be used as a reference value transmitter for this purpose. It should be noted, however, that a separate reference torque value transmitter is not required with a rotating field machine whose speed of rotation is controlled by a speed control circuit. In that case the reference torque value may be obtained from the output of the speed control in the speed control circuit. When operating in this manner, the reference torque value will be derived from the reference speed value and thus speed changes due to load changes will be taken into consideration.

BRIEF DESCRIPTION OF THE DRAWINGS

FIG. 1 is a circuit-block diagram of the circuit of the present invention.

FIG. 2 is a wave-form diagram illustrating torque ripple in asynchronous three-phase machines.

DETAILED DESCRIPTION OF THE PREFERRED EMBODIMENT

As shown on FIG. 1, a three-phase motor 2 is supplied with power from an inverter 6. Motor 2 is equipped with a tachometer 4 which is attached to its shaft for rotation therewith to provide an electrical signal output which is proportional to the speed of rotation of the machine. Power from the three-phase line 5 is provided first to a converter 7 which during motor operation will act as a rectifier to convert the three-phase AC to a DC voltage which is provided through a DC link 8 to the converter 6. Converter 6 will act as an inverter, converting the DC to AC during motor operation. Such a system is typically installed in electrically powered vehicles such as a rail-bound vehicle. The complete converter system comprises the converters 6 and 7 connected by DC link 8. Converter 7 is controlled by the three-phase system voltage and converter 6 by a machine-timed control. Converter 6 will typically be a 6-pluse machine-timed converter. The DC link 8 has installed therein a current transformer 10 and a smoothing choke 9. Current transformer 10 is used to measure the actual value I of the current in the DC link. Converter 6 is controlled by a control unit 11 and converter 7 by a control unit 12.

As shown on FIG. 1 there are two basic control and regulating systems; the conventional regulating system within the dot-dash block labeled 30 and the correction circuit of the present invention within the dot-dash block 20. Basic operation of the circuits in block 30 will first be discussed.

Control unit 12 is synchronized with the line frequency obtaining an input from the three-phase line 5 over a line 13. It receives its control input from a current control 14 in well-known manner. At the input to the current control 14 is a summing junction (or comparator) 15 at which the actual value I of the current sensed at the current transformer 10 and a value $I_m^*$ are compared to provide an error signal input designated $\Delta_I$ to the current control 14. In conventional systems, the $I_m^*$ is commonly taken directly from a function generator which obtains its input from speed control 16 which also supplies an input to the control unit 11 of the converter 6. [That is, the junction 28 would normally not be present. It is the addition of a quantity here which provides torque correction as will be described below.] Speed control 16 has at its input a summing junction 17 at which a reference value $n^*$ is compared with the actual speed value n from the tachometer. The reference value $n$ is obtained from a reference value transmitter 18 which may comprise a potentiometer. Tachometer in many cases will be a digital device such as a digital shaft encoder in which case a digital to analog converter will be installed between the tachometer 4 and the summing junction 17.

Conventionally, the control circuit 14 and the summing junction 15 are used to insure that the current $i$ flowing in the DC link is held to a value predetermined by the reference transmitter 18 and the speed n. The converter 6 then alternatingly impresses this current on the individual phase connections of the rotating field machine 2. Because of this manner of switching the current to the individual leads, the torque of the rotating field machine 2 is not uniform in time but contains harmonics.

The control and regulating circuit 30 includes in conventional fashion a torque regulator 31. A summing junction 32 at the input to the torque regulator 31 has as inputs the speed dependent reference torque value $D^*$ obtained from the output of speed control 16 and the output of the torque computer 25 representing the actual value D of the torque. The error signal developed input is provided into the torque regulator 31 which will then provide an output designated $n''$ which will take into consideration the slip of the asynchronous three-phase machine. This is added to the actual speed value $n$ as a correction at summing junction 33 to develop a signal $n'$ which is used as the control voltage into the control unit 11 which operates the converter 6.

On FIG. 2, the wave shape of the torque D of an asynchronous three-phase machine is plotted as a function of time T for both motor operation, no-load operation and generator operation. The torque ripple shown has an undesirable effect, particularly at low speeds of the asynchronous three-phase machine as evidenced by noise and uneven running.

To significantly suppress this torque ripple at low speeds, the current reference $I^*_m$ is not kept constant or controlled only in dependence on the load of the three-phase machine but is also modulated as a function of torque ripple. Such control is possible as long as the period of the machine frequency is long when compared to the regulating time of the current control 14. Thus, this correction may be made effectively at the low machine frequency where torque ripple is most objectionable. This results in torque with almost uniform shape with respect to time in the range of low-machine frequencies. The circuit for providing the torque correction at low frequencies is designated as 20 in FIG. 1. It includes first and second absolute value circuits designated 21 and 22 respectively. The outputs of the two absolute value circuits are provided to a summing junction 23 at the input of a torque control 24. Through the use of the absolute value circuits 21 and 22, both motor and generator operation is made possible. The absolute value circuit 21 obtains its input from a torque computer 25. Torque computer 25 has as inputs the machine voltage $U_m$ provided a voltage transformer 26 and the machine current $I_m$ from a current transformer 27. These two quantities are used to determine the actual value of torque in a well-known manner. Such a torque computer is described, for example, in U.S. Pat. No. 3,593,083 based on German Pat. No. 1,806,769. Alternately a torque transducer 35 arranged on the rotor shaft 3 of the rotating field machine may be provided instead of torque computer 25. A switch 36 is shown which permits connection to either the torque computer 25 or the torque transducer 35.

The absolute value circuit 22 has as an input a reference value of torque D*. In the illustrated embodiment, this value is obtained as an output from the speed control 16 and will therefore change with the load torque of the rotating field machine 2. Alternatively, a reference value may be provided from a potentiometer 38. A switch 39 is shown for connecting the input to absolute value circuit 22 to either the potentiometer 38 or the output of speed control 16. The absolute value circuits 21 and 22 form respectively the absolute values of the torque D and the reference value of torque D*. After being summed at summing junction 23, the resulting output will be ΔD i.e., the torque deviation or error. This value is provided as the input to the controller 24 which provides as an output a quantity designated ΔI*. ΔI* is then provided to a summing junction 28 where it is summed with a reference current value I*, to obtain the value I*$_m$ used at the summing junction 15 at the input to the current controller 14. The value I* is developed in a function generator 29 having predetermined characteristics from the reference torque value D* described above in connection with absolute value circuit 22. The resulting value of I*$_m$ will be the normally constant I* modulated by the quantity ΔI* which represents the harmonics in the torque. This will result after processing through the current controller 14 and control unit 12, in a current flowing in the DC link 8 which is modulated in such a manner as to tend to cause the difference between the actual torque value D and the reference torque value D* to become zero, thereby causing a torque ripple to be cancelled out. If the actual torque value D obtained from the torque computer 25 becomes larger, the current I in the DC link will be caused to become smaller and vice versa. Through the use of the absolute value circuits 21 and 22, compensation of the torque ripple will be accomplished regardless of the sign of the torque of the rotating field machine 2.

Each of the controllers 14, 16, 24 and 31 are of conventional design and may be, for example, the circuit described on page 44 of "Applications Manual for Operational Amplifiers for Modeling, Measuring, Manipulating and Much Else," published by Philbrick-Nexus Research [1968]. That is, in essence they simply comprise operational amplifier integrators which integrate the error voltage at the input until an output is obtained which will result in zero input. A typical function generator which may be used as function generator 29 is described on page 51 of the same manual. Converters 6 and 7 along with their associated control units 11 and 12 may be essentially as described in the textbook entitled "Line Commutated Thyristor Converters" by Moltgen, page 332, FIG. 237, [ Pitman Publishing, May 1972]. The absolute value circuits 21 and 22 may be of conventional design such as that shown and described on page 59 of the above referenced manual.

Thus, an improved method and a circuit for cancelling out the torque ripple which causes undesirable effects at low speeds in rotating machines has been shown. Although a specific embodiment has been illustrated and described, it will be obvious to those skilled in the art that various modifications may be made without departing from the spirit of the invention which is intended to be limited solely by the appended claims.

What is claimed is:
1. In a drive system for a rotating machine wherein the machine is coupled to a multiphase AC line through a first converter, a DC link and a second converter, said system having means for controlling the current flowing in the DC link, a method of reducing the torque ripple comprising:
   a. measuring the actual value of torque developed by the machine;
   b. establishing a predetermined reference value of torque which is to be maintained;
   c. comparing the measured value of torque with said predetermined reference value to develop an error signal; and
   d. providing said error signal as a correction term to the means for controlling current in the DC link.
2. In a drive system for a rotating machine wherein the machine is coupled to a multiphase AC line through a first converter, a DC link and a second converter, said system having means for controlling the current flowing in the DC link apparatus for reducing the torque ripple comprising:
   a. means to measure the torque developed by the machine and to provide an output signal indicative thereof;
   b. means to develop a reference torque signal;
   c. means to difference said output signal and said reference signal to obtain an error signal; and
   d. means to provide said error signal as a correction term to the means for controlling the current in the DC link.
3. The invention according to claim 2 wherein said error signal is provided to a torque control and wherein said means for providing comprise means to add the output of said torque control to a reference value representing the constant current desired in the DC link.
4. The invention according to claim 3 and further including a first absolute value circuit having said output signal as an input and providing its output to said means to difference.
5. The invention according to claim 4 and further including a second absolute value circuit having said reference signal as an input and providing its output to said means to difference.
6. The invention according to claim 2 wherein said means to measure comprises a torque transducer mechanically coupled to the rotor of the machine.
7. The invention according to claim 2 wherein said means to measure comprises:
   a. means to sense the current being fed to the machine;
   b. means to sense the voltage being fed to the machine; and
   c. a torque computer having the outputs of said current sensing and voltage sensing means as inputs.
8. The invention according to claim 2 wherein said means to develop a reference torque signal comprises a potentiometer.
9. The invention according to claim 3 wherein there is a speed control circuit associated with the rotating-field machine and wherein said reference torque signal is obtained from the speed control.

* * * * *